United States Patent [19]
London

[11] Patent Number: 6,061,734
[45] Date of Patent: May 9, 2000

[54] SYSTEM AND METHOD FOR DETERMINING IF A MESSAGE IDENTIFIER COULD BE EQUIVALENT TO ONE OF A SET OF PREDETERMINED INDENTIFIERS

[75] Inventor: Thomas Bennet London, Mountain View, Calif.

[73] Assignee: AT&T Corp, New York, N.Y.

[21] Appl. No.: 08/936,669

[22] Filed: Sep. 24, 1997

[51] Int. Cl.[7] .................................................. G06F 15/173
[52] U.S. Cl. ........................ 709/238; 709/233; 709/232; 709/249; 709/225; 380/29; 380/9; 380/37; 380/49; 395/601; 395/602; 395/610
[58] Field of Search .................................. 380/29, 9, 37, 380/49, 21, 23, 25; 708/250; 395/601, 602, 610, 609, 712; 713/202, 201; 709/303, 220, 225, 238, 233, 232, 249; 711/163

[56] References Cited

U.S. PATENT DOCUMENTS

| | | | |
|---|---|---|---|
| 5,301,247 | 4/1994 | Rasmussen et al. | 380/43 |
| 5,638,448 | 6/1997 | Nguyen | 380/29 |
| 5,659,616 | 8/1997 | Sudia | 380/23 |
| 5,684,951 | 11/1997 | Goldman et al. | 395/188.01 |
| 5,701,464 | 12/1997 | Aucsmith | 395/610 |
| 5,778,069 | 7/1998 | Thomlinson et al. | 380/25 |

*Primary Examiner*—Frank J. Asta
*Assistant Examiner*—Beatriz Prieto

[57] ABSTRACT

A system and method for determining if a received identifier could be equivalent to one of a set of predetermined identifiers. Predetermined identifiers are encoded into an output. The coded output is stored on a node in a network. An identifier is received over the network and is tested against the coded output. The test reveals if the received identifier could be equivalent to one of a set of predetermined identifiers encoded into the output. An action can be taken that depends upon the outcome of the test. The present invention is useful in efficiently routing messages in a network, determining the authorization of user requests, and other applications.

23 Claims, 5 Drawing Sheets

SYSTEM AND METHOD FOR DETERMINING IF A MESSAGE IDENTIFIER COULD BE EQUIVALENT TO ONE OF A SET OF PREDETERMINED INDENTIFIERS

FIELD OF THE INVENTION

This invention relates to efficiently determining if the identifier of a message received at a network node could be equivalent to one of a set of predetermined identifiers.

BACKGROUND OF THE INVENTION

Efficiently determining if the identifier of a message received at a network node could be equivalent to one of a set of predetermined identifiers is useful in numerous networking applications. One such application is verifying that the sender of a message received at a peer on the network is authorized to receive a service requested in the message. For example, a first peer that is a proxy server receives a message from a user over a first network. The message requests service from a second peer, a resource that provides the requested service, on a second network. The first peer (the proxy server) sends the message to the second peer (the resource), and the resource provides the requested service to the user. This simple scenario is most likely to occur when the service provided by the resource is freely available to all users.

However, when the service is not freely available, the user request must be checked to determine if the resource is authorized to provide service in response to the request. For example, a service is sold by subscription. When a request is received, it must be determined if the request correspond to a valid subscription. If it does, then the resource provides the service. If it does not so correspond, then the resource denies the service.

One known method for checking if a resource is authorized to provide service based upon a request is to receive all requests for service at the resource, and determine the authorization of each request before responding. This can disadvantageously overburden the resource, particularly when a large number of requests are received and have to be checked. Another known method is to check the requests at an intermediate point between the requesting user (the requester) and the resource, such as the proxy server. A request is only forwarded to a resource if the proxy server determines that the request is authorized, thereby mitigating the burden on the resource by appropriately routing each message based upon its authorization. This, however, introduces the problems of distributing and maintaining the accuracy of authorization data (such as subscriber lists) to several proxy servers, which can disadvantageously generate a substantial amount of network traffic. Further, having to check every request for authorization against a list can be time consuming and burdensome. These problems are especially severe for services with large, dynamic (rapidly changing) subscriber bases. These problems are further exacerbated if a proxy server is configured to receive requests for many different services, each with its own subscriber list. When there are several proxy servers in a large network that are so configured, maintaining the accuracy of authorization criteria (such as subscriber lists) for all services across all proxy servers can be impractical.

Figure 1:
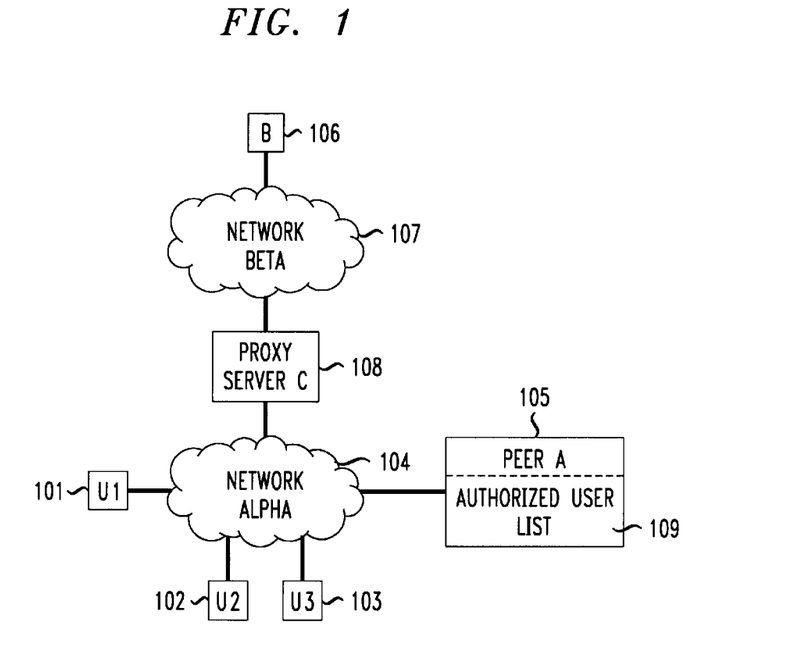
FIG. 1 shows a prior art system for routing messages to a resource in a network using a subscriber list stored on the peer that receives the message to be routed.

In certain known systems, a user sends a request to a peer, which forwards the request to a proxy server, which in turn forwards the request to a resource. Such a system is shown in FIG. 1. Users U1 101, U2 102 and U3 103 send messages through network alpha 104 to peer A 105 requesting service from a resource B 106 on network beta 107. Only U2 102 and U3 103 are subscribers to resource B 106. Proxy server C 108 is connected to both network alpha 104 and network beta 107, and processes requests for service directed to resource B from users on network alpha 104. One known method provides authorization criteria (e.g., subscriber lists) to Peer A 105, which carries out the authorization routing function rather than the proxy server C 108.

Peer A first registers (or logs on) to resource B 106 through peer C 108. Resource B provides peer A 105 with a sorted list of subscriber entries that comprise network addresses of subscribing users U2 and U3. A request for service from resource B is sent from a user to peer A. The request includes a user identifier, such as the user's network address. The user's address is checked against the list of subscriber addresses at Peer A. If the user's network address matches a subscriber address, the user's request is forwarded to proxy server C 108 as an authorized request for service. Proxy server C 108 then forwards the request to resource B 106. If no match is found, the message is not forwarded to proxy server B, and a return message sent to the user indicating a denial of service. Devolving the authorization routing function to the peer advantageously reduces the burden on the proxy server, and can be more efficient when the peer serves a homogeneous and relatively small community of user subscribers. In other words, this method can be efficient when the number of users from which the peer receives requests for service is relatively small, and the number of different services the peer must authorize is also small. However, this known method does not scale well as the number of peers and users increases. The sizes of subscriber table in peer A 105 grows with the number of subscribers to resource B 106. Maintaining the accuracy of such subscriber tables for a large number of peers can be impractical, especially when the subscriber base is dynamic. A substantial amount of message traffic is disadvantageously generated between proxy server B and peer A as the subscriber table in Peer A is sent and/or updated frequently to reflect changes in the authorizations of various users. Larger subscriber tables are also more computationally expensive to search, burdening the peer and taking up resources needed for other tasks.

Figure 2:
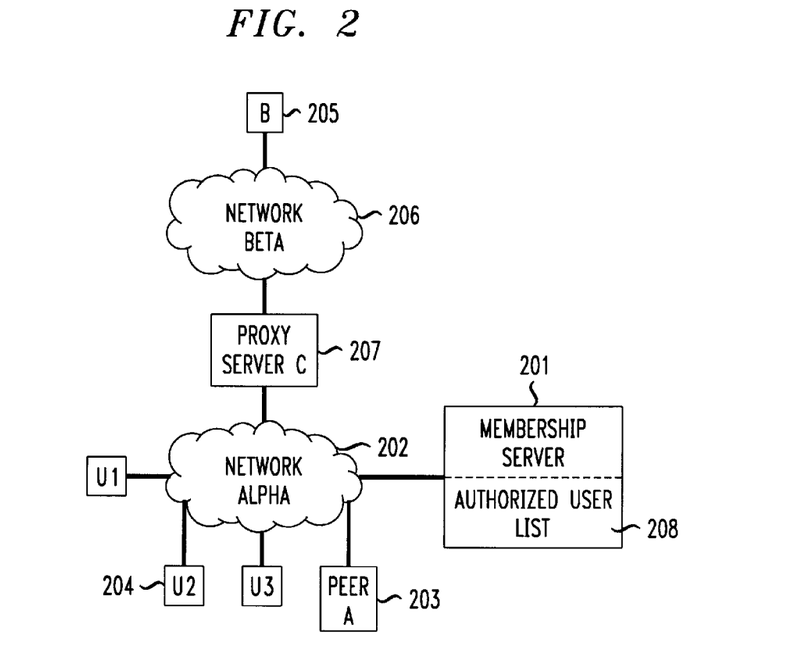
FIG. 2 shows another prior art system for routing messages to a resource in a network using a subscriber list stored on a membership server.

Another known system uses specialized authorization servers known as "membership servers" to carry out the authorization function, as shown in FIG. 2. Membership server 201 stores subscriber lists 208 and is connected to network alpha 202. When peer A 203 receives a request from a user 204 for service from resource B 205 connected to network beta 206, peer A 203 queries the membership server 201. Membership sever 201 consults the appropriate subscriber list 208 stored in computer readable memory to determine if the requesting user 204 is authorized to access resource B 205 for the requested service. Membership server 201 sends a message to peer A 203 indicating whether the requesting user 204 is authorized. Peer A 203 then caches the user's identifier and authorization for future reference. If the user is authorized, peer A 203 forwards the user request to resource B 205 through proxy server C 207. This method can be more efficient than maintaining current subscriber lists on each peer that receives requests from users. However, this known system also disadvantageously fails to scale well in large networks. A substantial amount of network traffic is disadvantageously generated between peer and membership server in determining authorization, and in maintaining the accuracy of subscriber lists when more than one membership server is needed.

Another disadvantage of known systems is that extensive memory resources are required to maintain subscriber lists, especially in large systems with many users. In certain known systems, users are identified by their user identifiers. For example, an Internet Protocol (IP) network address is represented by a string of 32 bits. A bit string of this length may be necessary for a network to distinguish users, but is unnecessarily long for the purpose of determining if a user is authorized to access a resource. On the other hand, a resource needs only enough information to distinguish the predefined, limited number of authorized users from the rest of all users. Relying upon an unnecessarily long bit string (such as a IP network address) to distinguish authorized users is expensive both in memory usage and in the processing time needed to search lists of such bit strings. This problem is particularly severe when a relatively large number of users subscribe to a given resource. A better system would be able to distinguish authorized users from unauthorized users while using substantially fewer bits per user that are easier to search than long lists of long bit strings.

A known partial solution to this is to represent a user identifier with an integer by using a hash function. A hash function maps a string (such as a network address) to an integer. Although hash functions realize some savings in memory resources and processor search time, they still impose a substantial overhead for large systems with many users.

Thus, known systems that distinguish authorized users from unauthorized users disadvantageously require substantial memory resources and processor time to establish, maintain and search subscriber lists. Further, they can generate substantial amounts of network traffic to distribute and maintain the coherence and/or accuracy of authorization databases.

A better system would distinguish authorized users from unauthorized users while requiring less memory and processor search time. Further, such a system when implemented for a large network would not concentrate the authorization function at the resource. At least part of the authorization function would be distributed over the network. In spite of being distributed, the accuracy of authorization criteria such as subscriber lists would be easy to maintain because such lists would be represented in a compact form, rather than as searchable lists of authorized users. A better system would also be tolerant of authorization errors. By relaxing the requirement of making a completely accurate authorization decision at a single point, less accuracy could be tolerated in the distributed authorization criteria, thereby advantageously decreasing the network traffic needed to keep it sufficiently accurate. The better system would scale well as the network size increased, and provide a more efficient way to handle requests for service based upon their authorization.

SUMMARY OF THE INVENTION

The present invention provides an efficient system and method for determining if a received message identifier could be equivalent to one of a set of predetermined identifiers, using a coded output (i.e., an output into which the predetermined identifiers have been encoded.) In accordance with the present invention, an action can be taken (e.g., routing the message, sending another message, initiating a telephone call, etc.) based upon this determination.

One embodiment of a coded output is a bit vector. A bit vector is a string of bits that has been encoded such that information (a message identifier) from a received message can be tested against the encoded bit vector to determine if a resource is authorized to receive the message. For examples a bit vector can be encoded with identifiers of users who are subscribers, to a service provided by a resource. When a message is received with a user identifier, the received user identifier is tested against the bit vector encoded with subscriber user identifiers. The results of the test indicate whether the received user identifier corresponds to a subscriber identifier that was encoded into the bit vector. The bit vector is advantageously substantially shorter than would be a list of the user identifiers with which it has been encoded. This advantageously reduces the amount of network traffic needed to keep such encoded bit vectors distributed throughout a network accurate, and requires less memory resources to store than a complete list. Testing the bit vector is also computationally less expensive than searching a long list of such identifiers, advantageously saving processor time and reducing the burden on the computer that carries out the test. The bit vector disclosed herein is but one embodiment of coded output that can be used in accordance with the present invention to substantially reduce the computational burden and network traffic imposed by known systems in determining if a received message having an identifier could be equivalent to one of a set of predetermined identifier.

A message identifier can be the source address of the message, but any data that servers use to distinguish the message from other messages constitutes an identifier. In the present invention, a message may be a packet or a series of packets in a connectionless or circuit switched network. As used herein, a message can be any form of data carried over a network.

In one embodiment of the present invention, the bit vector is encoded with subscriber information (e.g., predetermined identifiers) at the resource, and then distributed to peers on the network that receive requests for service from users. The term network means a single network, or a network of networks. The peer receives a message from a user requesting a service. The peer tests the encoded bit vector with identifying information in the received message (the received message identifier) to determine if the received message is authorized (e.g., the sender is a subscriber) to receive the requested service. If the test determines that the user is authorized, the message is forwarded to another peer (e.g., the resource). Otherwise, the message is not forwarded (e.g., it is deleted). If the message is not forwarded, the peer can send a denial of service message to the user that requested the service.

The bit vector test need not be perfectly accurate, as the present invention is still advantageous even if the test has an error rate. In accordance with the present invention, the bit vector test is completely accurate when it indicates that the user is not authorized for a service. That is, it never indicates that a user who is authorized is not so authorized. This advantageously prevents legitimate subscribers from arbitrarily and erroneously being denied service. On the other hand, the test need not be completely accurate when it indicates that a user is authorized. In other words, it may indicate that a user is an authorized subscriber and forward the user's request to the resource when in fact the user is not so authorized. A test result that indicates that a message is authorized when in fact it is not is called a "false positive." In accordance with the present invention, the rate at which false positives occur can be advantageously managed and made to be arbitrarily small.

In one embodiment of the present invention, false positives are tolerated. Service is provided to non-subscribers at an acceptable rate. In another embodiment where false positives are not tolerated, the resource determines the authorization of each request after it has been tested by a peer and forwarded. The authorization burden on the resource is still substantially reduced, because the peer has pre-filtered almost all unauthorized requests.

The bit vector is but one embodiment of the present invention, which encompasses the use of any output that has been encoded with predetermined identifiers and that can be tested to determine if a received message identifier could be equivalent to one of a set of predetermined identifiers encoded therein. Further, routing is but one application of the present invention. For example, the output can be encoded with a list of subscribers to an alarm service. When an alarm signal is received with an identifier at the network node storing the coded output, the identifier is tested against the coded output. If the test determines that the received identifier could be equivalent to one of the set of encoded identifiers (alarm service subscribers), the node can initiate a telephone call to the police department and relay the source location of the alarm signal.

Likewise, many outputs, each encoded with its own set of predetermined identifiers, can be stored at a network node. A received identifier can be tested against some or all of the coded outputs in turn. The results of the test for each output, either alone or in combination, can be used to specify an action that is to be taken responsive to the receipt of the identifier.

DETAILED DESCRIPTION

Figure 3:
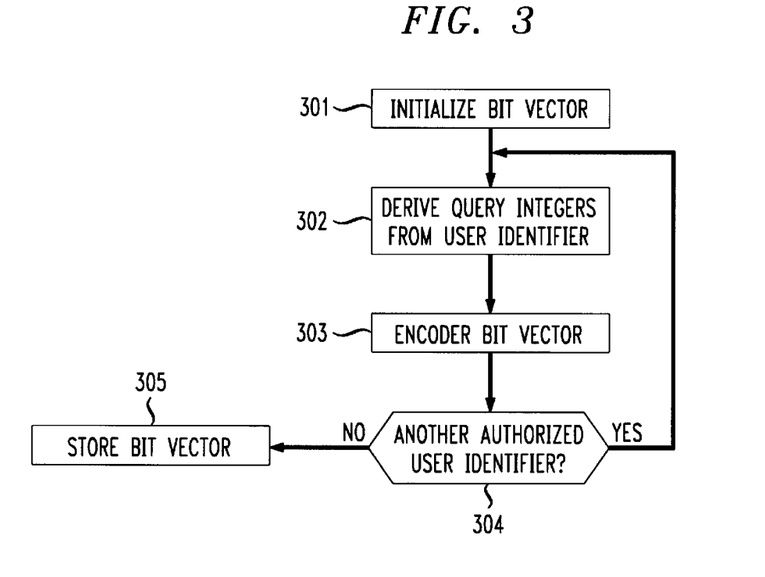
FIG. 3 shows a flow chart illustrating a method for constructing a routing bit vector with authorized user identifiers in accordance with the present invention.

In accordance with one embodiment of the present invention using the method of superimposed codes, and as shown in FIG. 3, a bit vector (a string of bits) is initialized 301 to a predetermined value. In one embodiment, all of the bits of the bit vector are initially set to be equal to the number one. In another bit vector embodiment, all of the bits of the bit vector are set to be equal to the number zero. An example of an initialized bit vector of length 16 bits is as follows:

Position: 0 1 2 3 4 5 6 7 8 9 10 11 12 13 14 15
Bit Value:1 1 1 1 1 1 1 1 1 1 1 1 1 1 1 1

The position of each bit is designated by the first row of numbers. The value of the bit at each position is indicated below the position number.

Next, a string of n query integers, $k_1, k_2, \ldots k_n$, are derived 302 from a message identifier using a predetermined coding method. In one embodiment, the message identifier is the identifier of the user sending the message. The message/user identifier can be a string identifying a user, a network address corresponding to the user, or any other means of identifying a user or group of users. In other embodiments, the message identifier is not a user identifier. For example, a message identifier can be a flag included in the message.

In the embodiment shown in FIG. 3, the message identifiers are authorized user identifiers 304. The user corresponding to the user identifier is connected to a first network that is authorized to access a resource. In one embodiment of the present invention, the resource is also connected to the first network. In another embodiment, the resource is connected to a second network. In one embodiment, the user identifier is the user network address. In another embodiment, the user identifier is the domain name of the user. User identifiers can be obtained from a list of subscribers authorized to access the resource.

In one embodiment, the n query integers, $k_1, k_2, \ldots, k_n$ are derived by carrying out a series of distinct predetermined hash functions $h_1, h_2, \ldots, h_n$, respectively, on the user identifier. For example, if the identifier of the authorized user is A and n=3, then suppose there are a predetermined set of hash functions $h_1$, $h_2$ and $h_3$ such that:

$h_1$ (A)=32
$h_2$ (A)=164
$h_3$(A)=96

Hence, $k_1$=32; $k_2$=164; and $k_3$=96.

In another embodiment of the present invention, a single hash function H is carried out on the identifier of the authorized user, the result being used as a seed for a pseudo-random number generator, which is then iterated n times to generate the n query integers $k_1, k_2, \ldots k_n$.

The bit vector is then encoded 303 with the query integers. Each query integer $k_i$ for a given user identifier is held to represent a bit position in the bit vector. In one embodiment, the most significant bit of the bit vector is the zero position, and the next most significant is in the first bit position, etc., as shown above.

In another embodiment, the least significant bit of the bit vector is the position zero bit, the next most significant in the position one bit, and so on, as shown in the following example of an initialized bit vector of length 16 bits:
Position: 15 14 13 12 11 10 9 8 7 6 5 4 3 2 1 0
Bit Value:1 1 1 1 1 1 1 1 1 1 1 1 1 1 1 1

The bit vector is encoded with the query integers for a given address by changing the value of the bit at each position given by the query integer $k_1, k_2, \ldots k_n$ to the opposite of its initialized value. Hereinafter, the initialized value of a bit vector bit is called the initial-value; the opposite value is called the switched-value. For example, a bit vector of length 16 bits initialized all to the value 1 that is encoded with the query integers $k_1$=5, $k_2$=2, and $k_2$=9 is as follows:

Position: 0 1 2 3 4 5 6 7 8 9 10 11 12 13 14 15
Bit Value:1 1 0 1 1 0 1 1 1 0 1 1 1 1 1 1

As can be seen from this example, a bit vector of 16 bits in length stores information regarding the authorization of a user based upon a substantially longer authorized user identifier such as a network address. For example, suppose three authorized user query integers are derived from a 32 bit IP address and encoded on a 16-bit bit vector. Hence, in accordance with this example of the present invention, a 16 bit vector from which authorization information can be derived is stored in place of a 32 bit network address (e.g., as an element on a subscriber list.) This demonstrates the improved efficiency with which the present invention is able to store authorization information, especially compared with known methods.

The superior efficiency of the present invention over known methods is multiplied when this process is repeated for additional authorized user addresses 304. The bit value at a query integer position of the same bit vector is changed to the opposite of its initialized value, which is not necessarily the opposite of its present value. When authorized user addresses have been encoded into the bit vector, the bit vector is stored 305 and can be used in an efficient and advantageous way to determine if a given user identifier is that of an authorized user.

Figure 4:
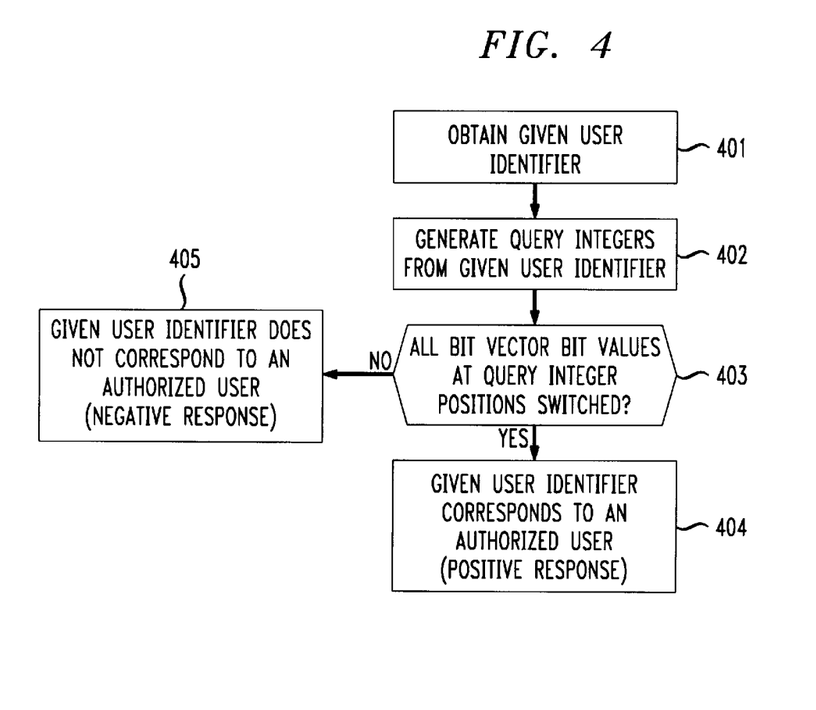
FIG. 4 shows a flow chart illustrating a method for using the routing bit vector to make a routing decision with respect to a given user identifier in accordance with the present invention.

An embodiment of the method in accordance with the present invention for testing an encoded bit vector with a user identifier from a received message is shown in FIG. 4. The given identifier is first obtained 401 and then is used to generate query integers $k_1', k_2', \ldots k_n'$ 402 using the same predefined coding method that was used to encode the bit vector. The bit vector positions corresponding to the query integers derived from the given identifier are checked 403. If the value of the bit at each and every position corresponding to an query integer $k_1', k_2', \ldots k_n'$ is a switched value, then the given identifier is held to correspond to that of an authorized user 404. In this case, a "positive result" is said to have been obtained by checking the given identifier against the routing bit vector. If the value of at least one bit at any position corresponding to an query integer $k_1', k_2', \ldots k_n'$ is an initial value, then the given identifier is held not to correspond to that of an authorized user 405. In this case, a "negative result" is said to have been obtained by checking the given identifier against the routing bit vector The embodiment of the present invention using superimposed code is capable of providing a false positive response to a test. A false positive response is provided when the test indicates that a given identifier corresponds to that of an encoded authorized user, when in fact the given identifier does not correspond to that of an encoded authorized user. This can occur when two overlapping sets of authorized user query integers overlap. For example, consider the case where a first authorized user identifier generates the query integers: $k_1, =32; k_2=164;$ and $k_3=96$. A second authorized user identifier generates the query integers: $k_1'=96; k_2'=4;$ and $k_3'=77$. Suppose a given identifier does not correspond to that of an authorized user, and the given identifier generates the query integers $k_1''=164; k_2''=96;$ and $k_3''=77$. Even though this combination was not encoded into the bit vector from a single authorized user identifier, the combination of encoding two other authorized identifiers will cause the method in accordance with the present invention to indicate that the bits at the positions corresponding to the given identifier are all the opposite of their initial values, and that the given identifier therefor corresponds to that of an authorized user. This is a false positive.

Although the present invention is capable of returning a false positive results, the frequency of these false positive indications can be minimized by choosing appropriate values for the number of query integers to generate for a user identifier and the length of the superimposed code bit vector It is known in the art that the probability of obtaining a false positive from a superimposed code bit vector of length L is minimized when the number of ones and zeros in the bit vector are equal. Once this condition is met, the false positive rate can advantageously be reduced by increasing the number of query integers generated from an identifier. The set of query integers generated from a user identifier is hereinafter referred to as a query word. The number of query integers in a query word is called the length of the query word.

Figure 5:
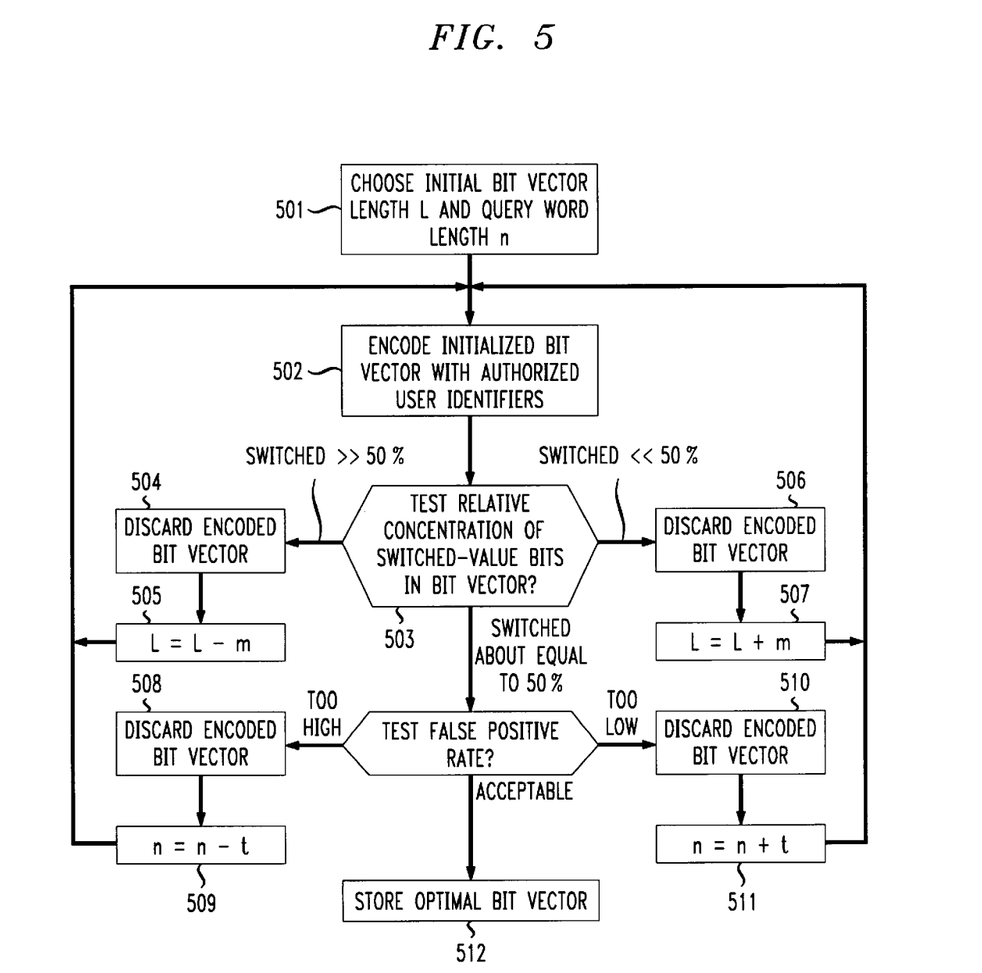
FIG. 5 shows a flow chart illustrating a method for optimizing the construction of the routing bit vector in accordance with the present invention.

As shown in FIG. 5, to reduce the rate at which false positives are generated in accordance with the present invention, a query word length n and a superimposed bit vector length L are initially chosen 501. Next, all of the message identifiers (shown as authorized user identifiers in the embodiment illustrated by FIG. 5) are encoded 502 on the bit vector by switching the value of each bit at a position corresponding to an query integer derived from an authorized user identifier to the opposite of its initialized value. The bit vector is then tested for its relative concentration of initial-value bits and switched-value bits 503. If the number of initial-value bits substantially exceeds the number of switched-value bits, then the encoded bit vector is discarded 504, and a new, longer initialized bit vector is selected 505 and re-encoded 502. In one embodiment, the length of the new bit vector is selected by decrementing the length of the old bit vector by the value of an integer m. This process is repeated until a bit vector of length L is found such that the number of switched bits is about equal to the number of initial value bits after the bit vector has been encoded.

Conversely, if the number of switched-value bits substantially exceeds the number of initial-value bits, then the encoded bit vector is discarded 506, and a new, shorter initialized bit vector is selected 507 and re-encoded 502. This process is repeated until a bit vector length L is found such that the number of switched bits is about equal to the number of initial value bits.

An encoded bit vector with about equal numbers of initial-value bits and switched-value bits is said to be balanced.

An encoded bit vector can be tested to determine its false positive rate. In one embodiment, this test is carried out by constructing several thousand simulated unauthorized user identifiers, and testing them against the encoded bit vector. The false positive rate is the number of unauthorized identifiers that the bit vector indicates are authorized, divided by the total number of tested unauthorized identifiers.

If the false positive rate of a balanced bit vector is unacceptably high, then the encoded bit vector is discarded 508 and the length of the query word is increased. In one embodiment, the length of the query word is incremented by a fixed value t. A newly initialized bit vector is then encoded, balanced and tested again. This process is repeated until an acceptable false positive rate is obtained, and the optimal bit vector is stored 512.

Conversely, the query word size can be advantageously reduced if the false positive rate is unnecessarily low. In this case, the bit vector is discarded 510 and the length of the query word if decreased. In one embodiment, the length of the query word is decreased by a fixed value t. A newly initialized bit vector is then encoded, balanced and tested again. This process is repeated until an acceptable false positive rate is obtained at an advantageously reduced query word length, and the optimal bit vector is stored.

Optimal bit vector and query word lengths in accordance with the present invention may thus be obtained empirically.

Optimal bit vector and query word lengths can also be obtained analytically. The probability of obtaining a false positive is approximately given by the equation:

$$P(\text{false}) \approx \exp[(-L(r/n)\log(u)\log(1-u)],$$

where $$u=(1-k/L)\exp(n)$$

Here, P(false) is the probability of a false positive; L is the length of the superimposed code bit vector; r is the number of user identifiers encoded into the bit vector; n is the query word length (i.e., the number of query integers associated with a user identifier) ; k is the number of switched bits in the encoded superimposed bit vector (ideally half its length L). Parameters L and n can be adjusted to obtain a desired P(false) for a given r and k. As can be seen from the equations above, a larger L will require smaller n (query word length) in order to attain the same false positive rate. As discussed above, the rate of false positives is minimized when k/L =0.5. Thus, the most efficiently sized encoded bit vector will have a length twice that of the number of switched-value bits that it contains.

Figure 6:
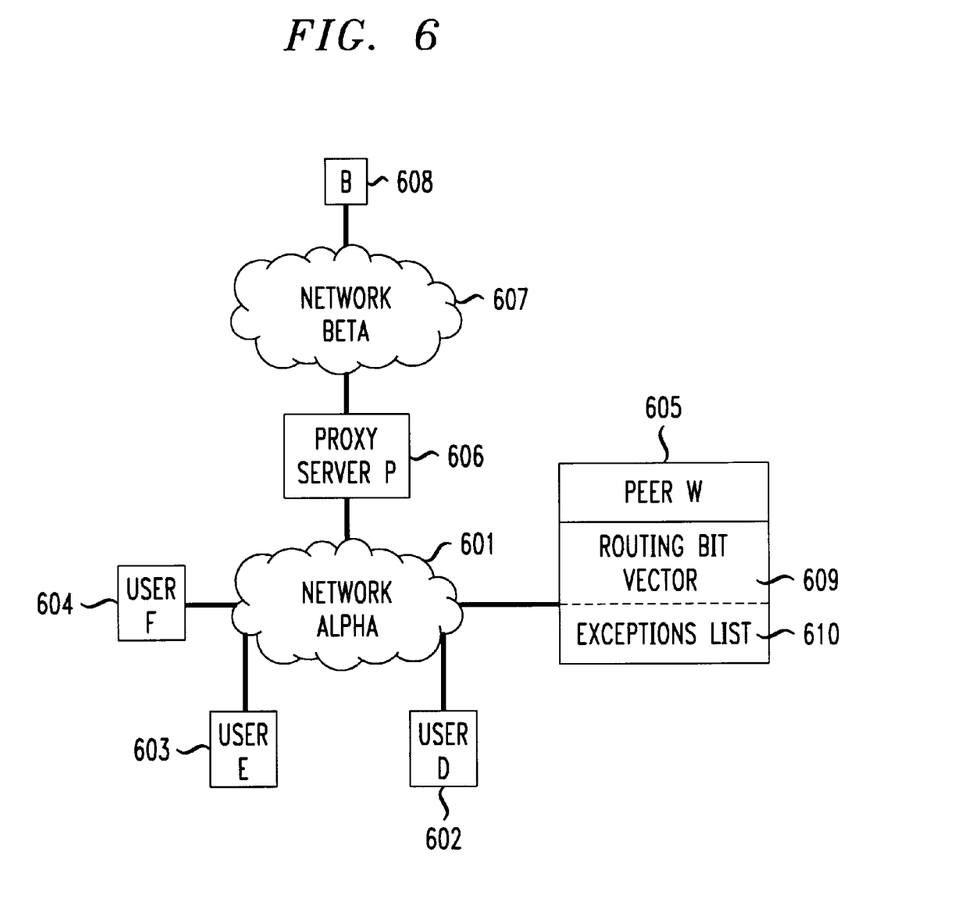
FIG. 6 shows a system for routing messages to a resource in a network in accordance with the present invention.

A system in accordance with the present invention is shown in FIG. 6. Network alpha 601 connects users E 602, F 603 G 604, peer W 605 and proxy server P 606. Proxy server P 606 is also connected to networks beta 607, to which in turn is connected resource B 608.

The method for encoding a routing bit vector shown in FIG. 3 is carried out in this embodiment at resource B, which stores user identifiers for users authorized to access resource B 608. In one embodiment, this routing bit vector is optimized in accordance with the methods shown in FIG. 5. Resource B 608 sends a copy of the encoded routing bit vector to proxy server P 606. Proxy server P 606 in turn distributes a copy of the bit vector to peer W 605. Peer W stores the routing bit vector in computer readable memory 609.

In accordance with the present invention, peer W receives a request from user E 603 for access to resource B 608. Peer W carries out the method shown in FIG. 4, examining the routing bit vector 609 based upon query integers derived from user E's 603 user identifier. If the method shown in FIG. 4 returns a positive response 404, then peer W 605 forwards user E's 603 request to proxy server P 606, which in turn forwards the request to resource B 608. If a negative response is returned 405, then peer W 605 does not forward user E's 603 request to proxy server P 606, and sends a message to user E 603 indicating that the requested access to resource B has been denied.

False positives can be tolerated in certain systems where a perfect screening process that eliminates all unauthorized users is not needed. Such systems are typically able to tolerate a certain threshold rate of false positives, which can be engineered in accordance with the present invention as described above by adjusting the lengths of the bit vector and the query words in a given situation (see, e.g., FIG. 5.)

The effect of false positives can be mitigated by maintaining an exceptions list at peer W 605. The exceptions list comprises a list of user identifiers known to generate false positives when the present invention is used to determine whether to pass a request to a proxy server. This requires a further check of user authorization either at the proxy server 606 or at resource B 608 using another method, such as checking an authorized user identification list.

In one embodiment, user F 604, who is not authorized to access resource B 608, sends a request to peer W 605 for access to resource B 608. Peer W 605 carries out the method in accordance with the present invention, examining the routing bit vector 609, which returns a false positive. Peer W 605 then forwards the request to the proxy server 606, which forwards the request to resource B 608 Resource B 608 verifies the authorization user F 604 by comparing user F's 604 identifier with a list of authorized user identifiers. Resource B 608 discovers that user F is not an authorized user, and sends a message to this effect to proxy server P 606, which passes the message to peer W 605. In accordance with the present invention, peer W 605 adds the user identifier of user F 604 to an exceptions list 610 stored at peer W 605.

Although this embodiment of the present invention requires resource B 608 to maintain and search a complete list of authorized user identifiers whenever a user requests the service provided by resource B 608, it still provides a substantially more efficient way of screening authorized users than known systems. The list of authorized users is advantageously kept at its place of origin (e.g., the service to which the authorized users have subscribed), without having to be sent to proxy servers or peers. This advantageously reduces the amount of network traffic burdening the network compared to known methods in which such lists must be distributed. The resource is the best suited entity to carry store, maintain and search the list because it is dedicated to providing the service to authorized users. As the provider of the service, the resource is best positioned to make changes to the list of users authorized to use the service. Further, most of the unauthorized user requests are screened at the computer testing the bit vector (e.g., the peer or proxy), and never reach the resource. Thus, the present invention implemented with exception lists provides an efficient and economical way to determine the routing of a user request based upon the user's authorization, effectively handling the occurrence of false positives.

Although the embodiment shown in FIG. 6 shows a resource 608 located on another network 607 from the network 601 to which the user is directly connected, the present invention can be implemented in other embodiments where the resource sought by the user is directly connected to the same network as the user.

In accordance with one embodiment of the present invention, the peer checks its exceptions list before checking its bit vector, which is advantageous when the exceptions list is very short. In another embodiment, the peer checks the exceptions list after checking its bit vector. Although this means that the peer must search a list of user identifiers as a part of making its routing decision, the list is very short compared to a full list of authorized user identifiers, and is presorted. Thus, the present invention is still able to advantageously provide a substantially more efficient way to make routing decisions even when it employs an exceptions list.

A pseudo code embodiment for initializing and loading a bit vector in accordance with present invention is as follows:

```
initialize_bit_vector( );     /*initialize all of the
                               bits of the bit vector of
                               length L bits to zero*/
    i=0
    for(i<L)
    {
        set b(i)=0    /*b(i) is the bit at position i
                       in the bit vector*/
        i++
    }
imprint_bit_vector( );        /*imprint bit vector with
                               membership network address
                               data*/
    j=0
    while(j<N)    /*imprint address data for N
subscriber addresses*/
    {
```

```
        for A(j)   /*for address j*/
        {
               bp(O)=h(A(j))    /*bit position bp(0)
                                is the hash value of
                                network address A(j)*/
               b(bp(O))=1       /*set the bit at bit
                                position bp(1) to 1*/
               k=1
               for(k<M)    /*imprint M bit positions
per address A(j)*/
               {
                      bp(k)=RND(bp(k-1))    / * b i t
                                            position
                                            bp(k) is the
                                            pseudo-
                                            random
                                            number
                                            generated
                                            from bp(k-
                                            1)*/
                      b(bp(k))=1    /*set the bit at
                                    bit position
                                    bp(k) tp 1*/
                      k++
                      }
               }
        j++
      }
```

A pseudo code embodiment of checking a loaded bit vector for a requester with network address B is as follows:

```
check_address_status( );
{
        status=1    /*set status to default value of 1, meaning
                    that address B is a possible subscriber
                    unless established otherwise*/
        bp(1)=h(B)        /*bit position bp(1) is the hash value
                          of network address A(j)*/
        if (bp(0)=0)
                {
                   status=0
                   return
                }
        else
                {
                   k=1
                }
        for(k<M)    /*check M bit positions for address B*/
                {
                      bp(k)=RND(bp(k-1))    /*bit position bp(k)
                                            is the pseudo-random
                                            number generated from
                                            bp(k-1)*/
                      if b(bp(k))=0
                      {
                         status=0
                         return
                      }
                      else
                      {
                         k++
                      }
                }
}
```

In one embodiment of the present invention, 1000 prototype Internet domain names were created by taking 1000 words from a dictionary and appending the string ".com" to the end of each word. An error rate (i.e., false positive rate) of about one percent was achieved by constructing a bit vector of 10,000 bits (about 1.25 Kbytes). After running 5000 requests of non-subscriber addresses (i.e., none of the requests matched any of the 1000 prototype domain names), only 41 false positives were generated. In another embodiment, an error rate of about 2% was achieved using a bit vector 8000 bits long. After running 5000 requests of non-subscriber addresses, only 80 false positives were generated. In yet another embodiment, a false positive rate of about 0.1% was achieved using 15,000 bits (2 Kbytes) for the bit vector. After running 5000 requests of non-subscriber addresses, only 7 false positives were generated. At 28.8 Kbaud, it would take less than one second to download any of these bit vector from a proxy to a peer. This would typically be carried out only once when the peer initially registers with a service provided by a resource, or else whenever the peer logged on to the service. The latter case is particularly advantageous with a dynamic subscriber base that necessitates frequent updates of the bit vector.

Figure 7:
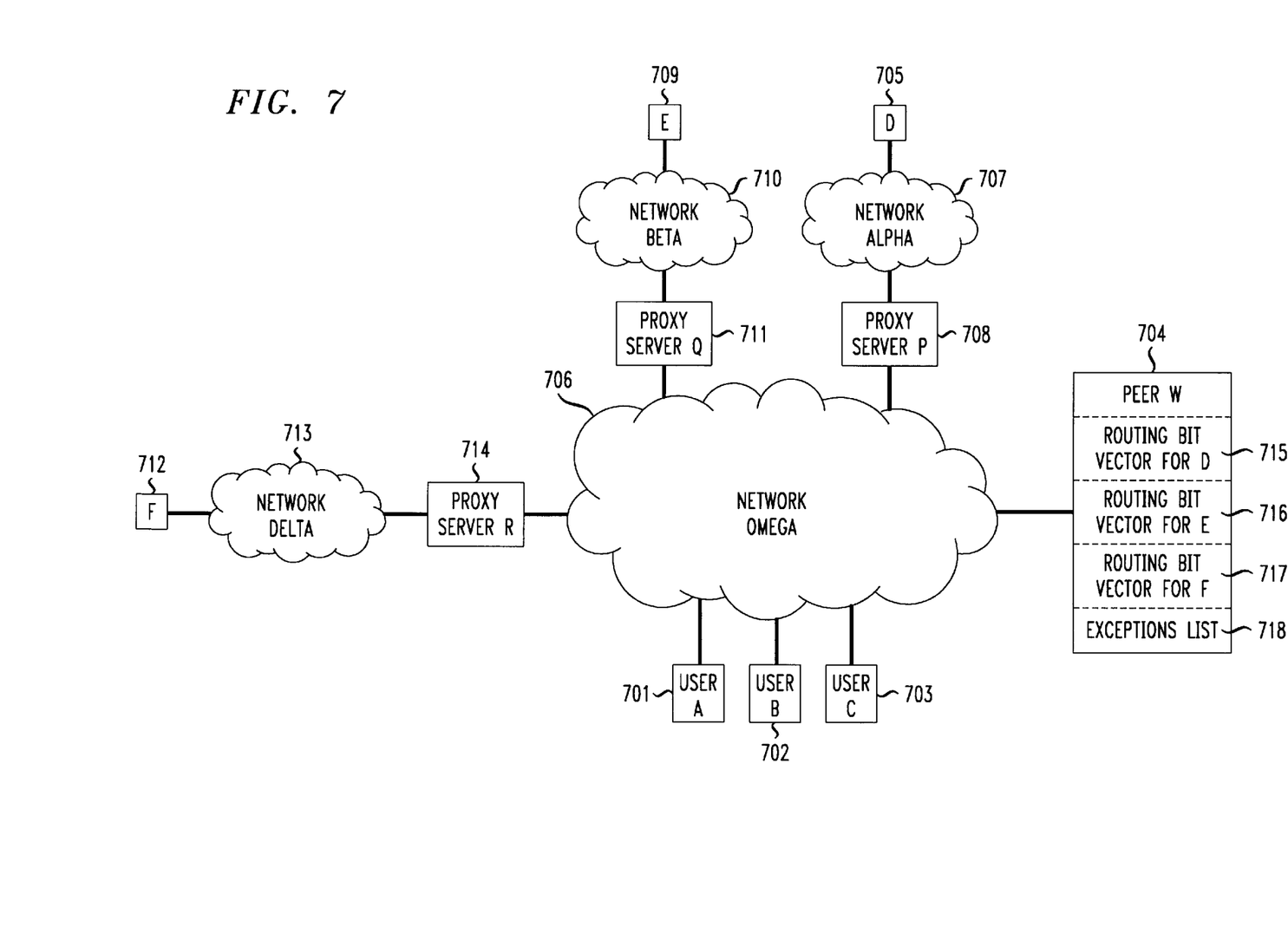
FIG. 7 shows a system for routing messages to a plurality of resources in a network in accordance with the present invention.

In another embodiment of the present invention, multiple routing bit vectors are stored on a peer W from several proxies. As shown in FIG. 7, users A 701, B 702 and C 703 send messages to peer W 704 requesting service from resources D 705 connected to network alpha 706, which in turn is connected to network omega 707 through proxy P 708; from resource E 709 connected to network beta 710, which in turn is connected to network omega 706 through proxy Q 711; and from resource F 712 connected to network delta 713, which in turn is connected to network omega 706 through proxy R 714. Resources D 705 E 709 and F 712 each stores a distinct authorized user list and each generates a bit vector based derived from its own list. Each routing bit vector for each resource is sent through network omega 706 to peer W 704. Peer W 704 thus stores in computer readable memory a routing bit vector for D 715, a routing bit vector for E 716 and a routing bit vector for F 717, as well as an exceptions list 718.

In accordance with one embodiment of the present invention, when W receives a request from a user, W consults each of the bit vectors in a round-robin fashion. If a bit vector returns a positive result, the request is forwarded to the proxy server to which the consulted bit vector corresponds. An exceptions list is maintained at peer W 704 for each bit vector.

Although FIG. 7 shows an embodiment wherein users 701, 702 and 703 connected to a first network omega 706 accessing resources 705, 709 and 712 through second networks alpha 707, beta 710 and delta 713, respectively, another embodiment of the present invention operates with resources directly connected to the same network as the users. Yet another embodiment operates with some resources connected directly to the same network as the users, and some resources connected to networks connected through proxy servers to the network directly connected to the users. In other embodiments, a message traverses several networks between a user and a resource.

A hardware embodiment of the present invention comprises a port to be connected to a network through which a message is received bearing an identifier; a computer readable memory that stores the coded output and computer program including instructions for testing a received identifier against the coded output to determine if the received identifier could be equivalent to one of a set of predetermined identifiers that has been encoded into the output; a processor for carrying out the instructions of the computer program stored in the computer readable memory and testing the received identifier against the coded output; and an electronic bus interconnecting the port, computer readable memory, and processor.

Another embodiment of the present invention comprises a receiver through which a message bearing an identifier is received over a network; computer readable memory storing the coded output; a tester that tests the received identifier against the coded output to determine if the received identifier could be equivalent to one of a set of predetermined identifiers that has been encoded into the output stored in the computer readable memory.

Although the present invention has been discussed primarily in relation to routing messages requesting services based upon the authorization of the user to receive the service, the message to elicit the service, and/or a resource to provide the service, the present invention is useful in other embodiments for efficiently routing messages in a network. For example, in another embodiment, the present invention uses encoded bit vectors to route messages based upon routing criteria keyed upon information contained in the messages. For example, one or more bit vectors can be encoded and stored in accordance with one embodiment of the present invention to reflect optimal routing paths for certain messages based upon information contained in those messages. In another embodiment of the present invention, one or more bit vectors can be encoded to implement a parental content control system. In accordance with this embodiment, the bit vectors can be used to identify data entering a household with audience ratings sought to be screened from the household's children. The present invention is useful when messages need to be efficiently screened to determine if information in the message corresponds to predetermined information that can be encoded into the bit vector. Examples of such information include subscriber lists, audience ratings (e.g., G, PG, PG-17, etc.), routing preferences, and so on.

Likewise, the present invention is useful in any application in which it would be useful to determine if a received identifier could be equivalent to cone of a set of predetermined identifiers, i.e., if a received identifier could be a member of a predetermined set of identifiers.

The present invention advantageously determines how to route a message based upon the results of testing an encoded bit vector. The bit vector is compact, easy to distribute and test, and can be advantageously complemented with an exceptions list. The present invention provides a more efficient and economical way of making routing decisions than known methods that do so by storing, maintaining and searching lists.

What is claimed is:

1. A method for determining if a received message identifier could be equivalent to one of a set of predetermined identifiers on a network, comprising the steps of:
   (a) initializing a bit vector of length L bits to a predefined value;
   (b) carrying out a predefined coding method on a predetermined identifier to obtain a coded predetermined identifier comprising a sequence of n integers $k_1, k_2, \ldots k_n$, where $1 \leq n \leq L$, and where $1 \leq k_i \leq L$;
   (c) encoding a bit vector with the coded predetermined identifier by changing the value of each bit in position $k_i$ of the bit vector to the opposite of its initialized value for all $1 \leq i \leq n$;
   (d) storing the encoded bit vector in computer readable memory accessible to a first computer connected to the network;
   (e) receiving a message with an identifier at the first computer, the received message identifier corresponding to the predetermined message identifier of step a;
   (f) carrying out the predefined coding method of step a on the received message identifier to obtain a coded received message identifier; and
   (g) testing the coded received message identifier against the encoded bit vector to determine if the received message identifier could be equivalent to one of a set of predetermined identifiers that has been encoded into the bit vector; and
   (h) performing a routing action based upon the results of the test to determine if the received message identifier could be equivalent to one of a set of predetermined identifiers that has been encoded into the bit vector.

2. The method of claim 1, wherein carrying out the predefined coding method on an identifier to obtain a coded identifier comprises the steps of:
   (a) carrying out a predefined hash function on the identifier to obtain a seed value; and
   (b) using the seed value in a pseudo-random function to generate query integers $k_i$ (i=1,2, . . . , n).

3. The method of claim 1, wherein carrying out the predefined coding method on an identifier to obtain a coded identifier comprises the step of carrying out a set of predefined hash functions $h_i$ (i=1,2, . . . , n) on the identifier, where $h_i$ (identifier)=$k_i$.

4. The method of claim 1, wherein testing the received message identifier against the encoded bit vector to determine if the received message identifier could be equivalent to one of a set of predetermined identifiers comprises the steps of:
   (a) carrying out the predefined coding method on the received message identifier to obtain a coded received message identifier comprising a sequence of n integers $k_1', k_2' \ldots k_n'$, where $1 \leq n \leq L$, where $1 \leq k_i' \leq L$;
   (b) determining if each bit in position $k_i'$ has a value opposite to its initialized value for all $1 \leq i \leq n$; and
   (c) if every bit in position $k_i'$ has a value opposite to its initialized value for all $1 \leq i \leq n$, then determining that the received message identifier could be equivalent to one of a set of predetermined identifiers.

5. The method of claim 1, wherein the routing action includes sending a message to a node on the network if it is determined that the received message identifier could be equivalent to one of a set of predetermined identifiers.

6. The method of claim 1, wherein if it is determined that the received message identifier could be equivalent to one of a set of predetermined identifiers, the routing action includes:
   a. sending the received message from the first computer to a second computer connected to the network;
   b. determining if the received message is an authorized message at the second computer;
   c. if the received message is not authorized, then:
      i. sending a false positive message from the second computer to the first computer indicating that the received message has produced a false positive; and
      ii. storing the false positive received message identifier on an exceptions list in computer readable memory accessible to the first computer.

7. The method of claim 6, further comprising the step of sending a negative response message to the sender of the received message.

8. The method claim 1, wherein if it is determined that the received message identifier could be equivalent to one of a set of predetermined identifiers, then the routing action includes:
   a. determining if the received message identifier occurs on an exceptions list stored in computer readable memory accessible to the first computer; and b. if the received message identifier is not on the exceptions list, then sending the received message to a second computer connected to the network.

9. The method of claim 1, wherein if it is determined that the received message identifier could be equivalent to one of a set of predetermined identifiers, then the routing action includes initiating a telephone call.

10. The method of claim 1, wherein if it is determined that the received message identifier could be equivalent to one of a set of predetermined identifiers, then the routing action includes carrying out an electronic transaction.

11. The method of claim 1, wherein if the test determines that the received message identifier could be equivalent to one of a set of predetermined identifiers, then the routing action includes associating the message with an audience rating, and controlling its dissemination in accordance with the audience rating.

12. The method of claim 1, wherein if the test determines that the received message identifier could be equivalent to one of a set of predetermined identifiers, then the routing action includes associating the message with an optimal routing path, and routing the message in accordance with the optimal routing path.

13. A system on a network for determining if a received message identifier could be equivalent to one of a set of predetermined identifiers, comprising:
   a. a first peer connected to the network that encodes a plurality of predetermined identifiers into a bit vector; and
   b. a second peer connected to the network including:
      i. computer readable memory that stores the bit vector; and
      ii a processor that receives a message having an identifier, tests the received message identifier against the stored bit vector to determine if the received message identifier could be equivalent to one of a set of predetermined identifiers, and performs a routing action based upon the determination of whether the received message identifier could be equivalent to one of a set of predetermined identifiers, said processor coupled to said memory; and
      iii. a port adapted to be coupled to the network, said port coupled to said processor.

14. The system of claim 13, further comprising a third peer, and wherein the routing action includes sending a message to said third peer if said second peer determines that the received message identifier could equivalent to one of a set of predetermined identifiers.

15. The system of claim 14, wherein said third peer determines if the message sent from said second peer is authorized, and if the message is determined by said third peer not to be authorized, then said third peer sends the message identifier to from said third peer to said second peer, where it is added to an exceptions list stored on said computer readable memory of said second peer.

16. An apparatus on a network for determining if a received message identifier could be equivalent to one of a set of predetermined identifiers, comprising:
   a. a port to be connected to the network and through which a message with an identifier is received;
   b. computer readable memory that stores a bit vector and a computer program;
   c. a processor that tests the received message identifier against said bit vector to determine if the received message identifier could be equivalent to one of a set of predetermined identifiers in accordance with instructions included in said computer program stored in said computer readable memory, and to perform a routing action based upon the determination of whether a received message identifier could be equivalent to one of a set of predetermined identifiers; and
   d. an electronic data bus interconnecting said processor, port and computer readable memory.

17. The system of claim 16, wherein if said processor determines that the received message identifier could be equivalent to one of a set of predetermined identifiers, said processor performs a routing action that includes sending the received message to a second apparatus connected to the network, said second apparatus comprising a second port to be connected to the network, a second computer readable memory, a second processor, and a second electronic data bus interconnecting said second port, second computer readable memory, and second processor.

18. The system of claim 16, wherein said apparatus further comprises a port to be connected to a telephone network, said telephone port connected to said electronic data bus, and wherein if said processor determines that the received message identifier could be equivalent to one of a set of predetermined identifiers, then said processor performs a routing action that includes initiating a telephone call through said telephone port.

19. A system for determining if a received message identifier could be equivalent to one of a set of predetermined identifiers, comprising:
   a. computer readable memory for storing a bit vector encoded with a plurality of predetermined identifiers;
   b. means for receiving the message; and
   c. means for testing the received message identifier against the bit vector to determine if the received message identifier could be equivalent to one of a set of predetermined identifiers; and
   d. means for performing a routing action based upon the determination of whether the message identifier could be equivalent to one of a predetermined set of identifiers.

20. The system of claim 19, further comprising means to initiate a telephone call when said means for testing the received message identifier against the bit vector determine if the received message identifier could be equivalent to one of a set of predetermined identifiers.

21. The system of claim 19, further comprising means for routing a message.

22. A method for determining if a received message identifier could be equivalent to one of a set of predetermined identifiers on a network, comprising the steps of:
   a. coding a plurality of predetermined identifiers to produce a coded output in accordance with a predefined coding method;
   b. storing the coded output in computer readable memory accessible to a first computer connected to the network;
   c. receiving a message with an identifier at the first computer;
   d. carrying out the predefined coding method of step a on the identifier of the received message to obtain a coded received message identifier; and
   e. testing the coded received message identifier against the coded output to determine if the received message identifier could be equivalent to one of a set of predetermined identifiers; and
   f. performing a routing action based upon the determination of whether the received message identifier is equivalent to one of a set of predetermined message identifiers.

23. A system on a network for determining if a received message identifier could be equivalent to one of a set of predetermined identifiers, comprising:
   a. a first peer connected to the network that encodes a plurality of predetermined identifiers to produce a coded output; and
   b. a second peer connected to the network including:
      i. computer readable memory that stores the coded output;
      ii. a receiver that receives a message having an identifier; and
      iii. a tester that tests the received message identifier against the stored coded output to determine if the received message identifier could be equivalent to one of a set of predetermined identifiers and
      iv. a processor that preforms a routing action based upon the results of determining if the received identifier could be equivalent to one of a predetermined set of identifiers.

* * * * *